April 5, 1955 S. ALLEN 2,705,399
COMBUSTION CHAMBERS
Filed Nov. 7, 1952

INVENTOR
SIDNEY ALLEN
BY Mawhinney & Mawhinney
ATTYS.

United States Patent Office 2,705,399
Patented Apr. 5, 1955

2,705,399

COMBUSTION CHAMBERS

Sidney Allen, Park Side, Coventry, England, assignor to Armstrong Siddeley Motors Limited, Coventry, England Application November 7, 1952, Serial No. 319,235

Claims priority, application Great Britain December 6, 1951

2 Claims. (Cl. 60—39.66)

This invention relates to a combustion chamber, for a gas turbine engine or for a rocket motor, in which a liquid fuel is to be burnt, the internal cross-section of the chamber being generally circular but not necessarily of constant radial extent along its length. In the case of a rocket motor the chamber provides a propulsion thrust through a nozzle at the open end of the chamber. In the case of a gas turbine engine the chamber supplies working fluid for the turbine.

One object of the invention is to simplify the manufacture of such a chamber and, if desired, of the nozzle in the case of a rocket motor.

A further object is to enable such a chamber to be satisfactorily cooled by water or other coolant. In the case of a rocket motor the nozzle can be similarly cooled. By adequately cooling the chamber and nozzle of a rocket motor, liquid fuel of the kind commonly used in a gas turbine engine can be used in the rocket motor.

According to the invention, the combustion chamber, or a main portion of it, includes a stack of abutting coaxial rings which are peripherally engaged with an outer coaxial shell in which they are located, the inner peripheries of the rings being shaped to form the desired configuration of the chamber or of the said main portion thereof. In the case of a rocket motor the nozzle at the outlet end of the chamber may be likewise formed.

The separate rings may be made of a non-metallic heat-resistant material, or, alternatively, of a metal having high heat conductivity such as aluminium or copper, which metal rings can be simply machined to the desired configuration. The shell can be of steel and of sufficient strength to withstand the stresses due to the combustion gases in the interior of the chamber.

According to a further feature of the invention, there are longitudinally-arranged ducts, for a coolant, formed by aligned holes in at least some of the adjacent rings near their inner peripheries. At least one of the abutting radial faces of an adjacent pair of rings which have the aligned holes in them may be provided with an annular groove defining an annular duct which effects a communication between the longitudinally-arranged ducts; and, furthermore, provision is made for leakage, from this annular duct, to occur at the inner periphery of the abutting faces of the adjacent pair of rings, whereby to provide a film of the coolant against the inner wall of that part of the combustion chamber.

Figure 1:
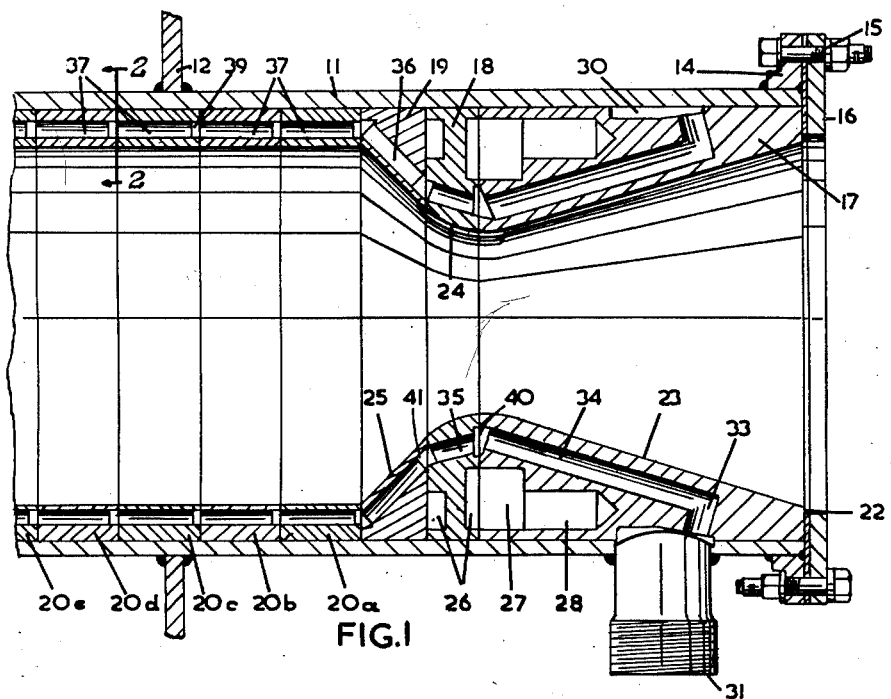
Figure 1 is a sectional elevation of part of the combustion chamber and nozzle of a rocket motor arranged according to the invention.
Figure 2:
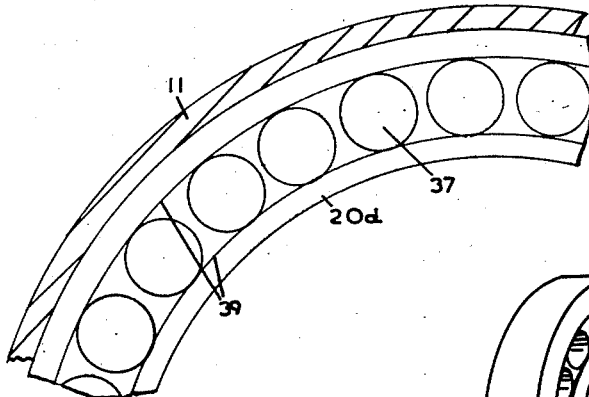
Figure 2 is a fragmentary section, to a larger scale, taken on the line 2—2 of Figure 1.
Figure 3:
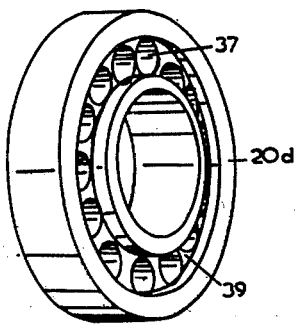
Figure 3 is a perspective view, to a smaller scale than that of Figure 1, of one of the rings from the downstream end, for example, of that to which the arrows 2, 2 are directed.

As stated, the drawing shows the invention as applied to the combustion chamber and nozzle of a rocket motor, and the means at the upstream end of the chamber, for supplying and combusting the liquid fuel and liquid oxidiser, are not shown as they form no part of the invention.

It will be observed that the shell 11, which, as stated is preferably of steel, is a cylindrical one, 12 representing part of a support which is welded to it. At the downstream end an external flange 14 is welded to the shell, and bolted at 15 to this flange is an inwardly-directed flange 16 against which the adjacent internal ring 17 of the stack is located. In addition to this specially-shaped end ring 17, there are abutting, specially-shaped rings 18 and 19, and then a number of similar cylindrical rings 20a, 20b, 20c, 20d, and 20e.

It should be understood that the upstream end of this stack of rings is likewise endwise located, for example, as described in connection with the ring 17 at the downstream end. The washer 22, or the equivalent washer (not shown) at the other end, or both these washers, may be a resilient one to allow for axial expansion or contraction of the rings. The outer peripheries of the rings are a close fit in the shell.

It will be observed that the inner peripheries of the rings are shaped to form a combustion chamber and nozzle for one type of rocket motor, the nozzle having a divergent outlet 23 provided by the ring 17, a throat 24 provided mainly by the ring 18, and a convergent portion 25 provided by the ring 19. The rings 17 and 18 (i. e., those having most metal in them) are shown as provided with lightening holes or grooves, namely, 26, 27 and 28.

The downstream ring 17 has, near its outlet end, an external annular groove 30 providing with the adjacent portion of the shell an annular duct to which coolant is supplied by means of an inlet nozzle 31; and, as stated, water may be used as the coolant, or the liquid fuel or the liquid oxidizer forming the propellant.

A number of passages 33 interconnect the annular duct 30 and a number of longitudinally-extending passages 34, the upstream ends of which latter mate with longitudinally-extending passages 35 in the ring 18, whilst the latter passages communicate with longitudinally-extending passages 36 in the ring 19. The upstream ends of the latter passages communicate with longitudinal passages 37 in the rings 20, forming straight longitudinal passages close to the inner peripheries of the rings.

As previously mentioned, provision may be made for leakage to occur at the inner peripheries of the abutting faces of any of the adjacent pairs of rings, whereby to provide a film of the coolant against the inner wall of that part of the combustion chamber or nozzle. In this connection each of the downstream faces of each of the rings 20 is shown as being formed with an annular groove of a width equal to the diameters of the longitudinal passages 37, this groove being marked 39 in the various figures of the drawings. Corresponding annular ducts 40, 41 are formed at the mating ends of the passages 34, 35 and 36. Leakage as previously mentioned can take place from these grooves or ducts.

Thus coolant can be circulated throughout the nozzle and main combustion portion of a combustion chamber by means of the longitudinally-extending passages, and these are bridged at intervals by annular ducts such as the grooves 39, 40 and 41 for the purpose described.

By constructing the chamber in the way of the invention, those rings which are subjected to the highest temperatures and, therefore, of shorter life than the others, can be replaced instead of, as with known constructions, the whole chamber having to be described.

What I claim as my invention and desire to secure by Letters Patent of the United States is:

1. A combustion chamber, for a gas turbine engine or for a rocket motor, in which a liquid fuel is to be burnt, in which at least a lengthwise portion of the inner surface of the annular wall of the chamber is defined by the inner peripheries of a stack of abutting coaxial rings, an outer coaxial shell with which said rings are peripherally engaged and in which they are located, said rings formed internally with longitudinally-extending ducts for a flow of a liquid coolant, and at least one of the radial abutting faces of an adjacent pair of said rings formed with an annular groove effecting a communication between the ducts of said pair of rings.

2. A combustion chamber, according to claim 1, in which the radial abutting faces of the pair of internally ducted rings have means at the radially inner side of the annular groove to allow of leakage of the coolant from said groove to provide a film of the coolant against the inner surface of the annular wall of that part of the combustion chamber.

References Cited in the file of this patent

UNITED STATES PATENTS

| | | |
|---|---|---|
| 2,470,184 | Pfenninger | May 17, 1949 |

FOREIGN PATENTS

| | | |
|---|---|---|
| 66,802 | Switzerland | July 25, 1913 |
| 578,007 | Great Britain | June 12, 1946 |